Sept. 9, 1969  H. S. SCHWARTZ  3,466,219
FIBER REINFORCED PLASTIC COMPOSITE MATERIAL
Filed Aug. 9, 1965
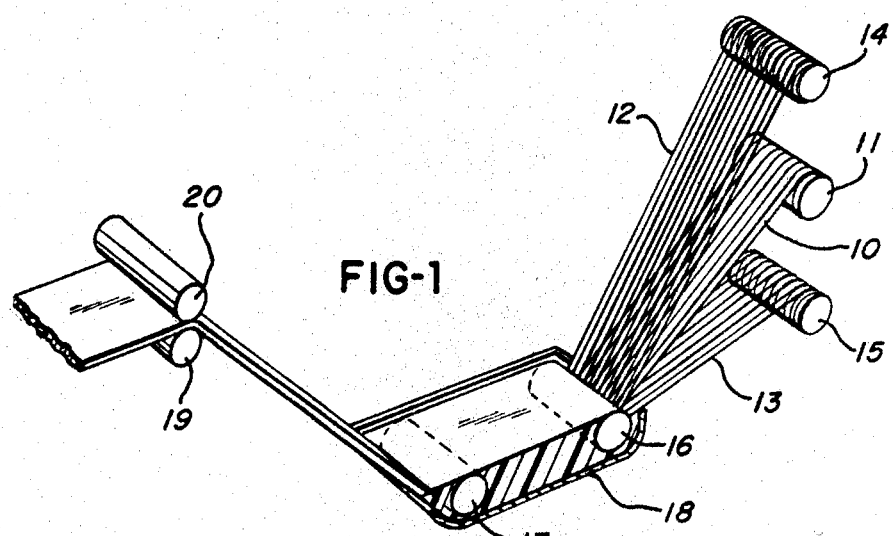
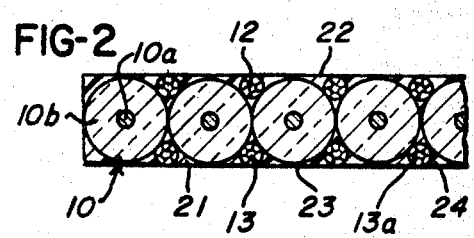
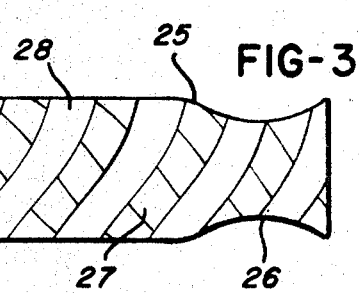
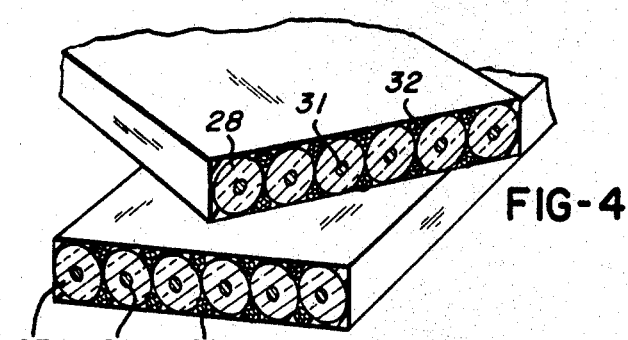
INVENTOR.
HERBERT S. SCHWARTZ
BY Harry A. Herbert Jr
ATTORNEY

United States Patent Office 3,466,219
Patented Sept. 9, 1969

3,466,219
FIBER REINFORCED PLASTIC COMPOSITE MATERIAL
Herbert S. Schwartz, Trotwood, Ohio, assignor to the United States of America as represented by the Secretary of the Air Force
Filed Aug. 9, 1965, Ser. No. 478,492
Int. Cl. B32b 5/12, 9/04
U.S. Cl. 161—57                                   1 Claim

ABSTRACT OF THE DISCLOSURE

Fiber reinforced composite plastic laminates. Small filaments are employed to improve interlaminary shear strength in composites utilizing large diameter filaments forming troughs as the main strengthening component with said small filaments filling said troughs.

---

The invention described herein may be manufactured and used by or for the United States Government for governmental purposes without payment to me of any royalty thereon.

This invention relates to structural plastic laminates or composites and particularly to those which are reinforced with filaments of relatively large diameter.

In the art of materials and particularly of plastic materials, it has long been known to employ a variety of fillers and reinforcers to improve the physical properties of the basic material in which the additive, usually in particulate form, is incorporated. In many instances, particularly of late with regard to high temperature and high stress applications involving laminated structures, it has been common to employ a reinforcing element in the form of a continuous filament wound about, within, or along the matrix material. Thus for example, in the case of rocket engines, nose cones and the like wherein high temperatures are encountered in highly oxidative environments and the material is subjected to the eroding influences of dynamic shear from exhaust gases and the like, it has been a common practice to employ a high temperature plastic such as a phenolic resin as the matrix and to reinforce the matrix with myriad windings of strands or filaments of a pyrolytic material such as graphite or a nitride, boride, carbide or the like. In other applications where high temperature capability is not necessary but structural reinforcement is required, it has been the practice to employ other filamentous reinforcements, and, in many cases, these are of a relatively non-ductile metal such as beryllium, and, like the pyrolytically coated filaments, are of relatively large diameter.

In building up a laminated structure of such filament-reinforced plastic composites, it has been a common practice to coat the filaments with the resin or plastic matrix material by immersing or spraying them and then allowing the plastic thus applied to become partially cured. In this stage, the fiber and plastic "pre-preg" as it is called may then be applied in layers as by winding as a continuous sheet or in narrower widths as a tape about an appropriate mold or form shaped according to the ultimately desired product. In this manner the reinforcing filaments held together by the partially cured plastic coating are wound about the form and upon themselves in successive layers. The filaments in a particular layer are usually parallel to each other and are aligned at different angles from the filaments of the adjoining layers. To obtain the greatest reinforcement or refractory capability, the art has recognized the desirability in most cases of so winding the reinforcing filaments that the successive convolutions thereof in side-by-side relation in the finished product are in tangential contact or substantial tangential contact with each other. In other cases, the filamentous reinforcement may be laid up in the matrix and the product finally formed by molding.

While all of these expedients have greatly enhanced the strength and durability of a variety of plastic materials, even the most advanced of such materials have been characterized by a pronounced deficiency of interlaminar shear strength and have been subject to premature failure because of untimely laminar separation. Certain of these failures at least have been attributable to the lack of integration between the reinforcing material and the matrix; and, while various techniques to improve the intimacy of the association between matrix and filament have met with a limited degree of success, it has been difficult, costly and time-consuming if not impossible to achieve complete and uniform envelopment of the reinforcing filaments by and within the plastic material.

It is accordingly an object of this invention to provide an improved fiber-reinforced plastic composite material.

Yet another object of the invention is to provide a filament-reinforced composite material wherein the filaments are completely enveloped by the plastic component representing the continuous phase of the composite.

Yet another object of the invention is to provide continuously-wound filament-reinforced ablative plastic composite materials to be employed in successive layers in which will have improved interlaminar shear strength and a laminated construction wherein the layers will not tend to separate.

To achieve these and other objects and advantages which will appear from a reading of the following disclosure, the present invention teaches the use in the same layer or thickness of the reinforced plastic of filaments or groups of filaments of at least two different diameters arranged so that those of larger diameter are in tangential contact or substantially tangential contact transversely of the layer forming troughs above and below their points of contact or near contact in which are positioned the smaller diameter filaments. In a preferred refinement of this invention, the smaller diameter filaments are of such size and are so placed relative to the side-by-side larger diameter filaments that the smaller filaments or bundles of smaller filaments are nominally spaced from but substantially occupy the entire space defined by the convergent cylindrical surfaces of the adjoining larger diameter filaments on the one hand and by the common plane of tangency to said larger diameter filaments on the other. Troughs of this type being formed both above and below the point of contact between the larger diameter filaments, in the usual and preferred practice the small diameter filaments will be placed in both sets of such troughs; i.e., on both the top and bottom of the layer of larger diameter filaments. The geometry of the companion filaments is such that the advantages of the within invention may be achieved where the ratio of the diameter of the relatively large filaments to that of the relatively small filaments is within the range of from ten to twenty-five, the larger filaments being placed in side-by-side, tangentially contacting or substantially tangentially contacting alignment, and the smaller filaments being positioned above and below the lines of such contact or near contact between said large diameter filaments.

In the manufacture of filament-reinforced plastic composite or laminated structures according to the present invention, the relatively large diameter filaments may be continuously wound upon a mandrel or other forming device, coated with the plastic matrix material by spraying or painting whereupon the smaller diameter strands may be wound about the same mandrel in the grooves or troughs formed by the windings of the large filaments. The small filaments may then be integrated with the plastic material by suitable painting, spraying or the like. In lieu of thus building up the arrangement of large and small diameter fibers in situ or at the time of the actual formation of the product to be composed of such material, a tape or layer of relatively small width containing both the large and the small diameter filaments may be formed by simultaneously feeding the large strands in side-by-side parallel relation along with the smaller diameter filaments, also in side-by-side parallel relationship, in registry with the grooves between the parallel alignment of the large filaments. This total arrangement of strands may then be led through a plastic coating stage such as an immersion bath or a plastic spray in such a manner that the plastic completely envelops and occupies all of the space between the aligned filaments in a particular strip. Such a strip may then be wound in successive layers about a suitable forming mandrel to achieve a laminated construction wherein the parallel filaments of individual layers of the tape windings will be angularly disposed to the parallel filaments in the windings comprising the adjacent layers.

The invention thus generally described may be more clearly understood by reference to the following detailed description of certain preferred embodiments thereof in connection with which reference may be had to the appended drawings.

In the drawings:

FIGURE 1 is an elevational schematic illustration of a system for practicing the method of the present invention.

FIGURE 2 is an enlarged cross-sectional view of a filament-reinforced plastic tape according to the present invention.

FIGURE 3 is an elevational view showing the manner in which the tape of FIGURE 2 may be employed in the manufacture of an article embodying the material of this invention.

FIGURE 4 is an enlarged fragmentary view in partial cross section and partially broken away showing the diverse angular relationship between the filaments in successive layers of a laminated construction employing the tape according to this invention applied in the manner illustrated in FIGURE 3.

While, as indicated above, the large and small diameter filaments may be arranged manually or by mechanical means in situ or at the time the ultimate product is being fabricated or prior to the molding thereof, one preferred method illustrated in FIGURE 1 is to cause the plastic and the continuous filaments to come together at a preliminary stage in the manufacture to form what is known as a "pre-preg" wherein the filaments are held in their desired relationship by the plastic matrix which is at least semi-cured to the point at which it will maintain sufficient dimensional stability of itself and of the filaments therein to allow for the nominal handling required in the manufacturing or laying up of a product of such material. While this process and the system illustrated in FIGURE 1 may be expanded to provide for the manufacture of large sheets of the "pre-preg" material reinforced with the filaments, the usual practice is that the "pre-preg" is formed or subsequently cut into a tape of relatively small width on the order of from one to four inches.

Referring now to FIGURE 1, a number of the relatively large diameter filaments or fibrous strands 10 are taken simultaneously from the supply roller 11 along with a number of the smaller diameter filaments or strands of fibers 12 and 13 from the supply rollers 14 and 15 respectively above and below the larger filaments. By suitable guiding means such as the rollers 16 and 17, the larger filaments reach an immersion bath 18 along with the smaller diameter filaments above and below them whereby all of the filaments pass together through and are wetted and coated by a suitable plastic matrix material such as phenolformaldehyde or the like. The fibers thus coated are then led from the immersion bath through squeeze rolls 19 and 20 and onto an air-drying conveyor or into an oven where the plastic material is at least partially cured.

After curing, the tape resulting from such operation will be as shown in cross section in FIGURE 2 wherein the large and small diameter filaments are shown to be preserved within the plastic matrix in the same position at which they were led by the supply and guide rolls into the immersion bath of FIGURE 1. It will be observed that the large diameter filaments 10 in FIGURE 2 are in side-by-side tangentially contacting relationship forming the troughs or grooves 21 between them in which the smaller diameter filaments 12 and 13 are positioned. In the preferred embodiment shown, it will be further noted from FIGURE 2 that the size of the small diameter filaments relative to the troughs formed between the contacting larger diameter filaments is such that the filaments are all within the space defined by the common plane of tangency to the large diameter filaments both along their top as at 22 and their bottom as at 23 and that the plastic matrix 24 occupies the space between the large diameter filaments at least to such planes of common tangency.

In a preferred embodiment of the material according to this invention of the type illustrated in FIGURE 2 and particularly adaptable for use in high temperature ablative applications, the larger diameter filaments may be of a highly refractory pyrolytic material such as pyrolytic graphite or a pyrolytic boride, nitride or carbide on the order from three to five mils in diameter. As is often the case, these so-called pyrolytic filaments may comprise a filamentous substrate 10a of a ductile or high tensile strength material such as titanium having a uniform coating 10b of the pyrolytic material deposited thereon. The smaller diameter strands on the other hand may be composed of a wide variety of dimensionally stable materials since it has been found that their primary attributes for the purposes of this invention reside in the mere fact of their physical presence rather than in any particular physical or chemical properties they might have, the overall properties of the composite material being primarily determined by the refractory or other properties of the large filaments. On the other hand, it is true that a nominally greater refractory capacity is achieved by a composite material wherein all of the filaments, both large and small, are composed of a refractory material. While pyrolytic filaments would be therefore desirable in the case of the smaller filaments, the present state of the art makes it difficult, if not impossible, to achieve sufficiently small diameter filaments of this nature, it being preferred that the smaller diameter fibers have a diameter on the order of only from .2 to .3 mil. As is also shown in FIGURE 2, the small diameter filaments may be composed of a plurality of fibers or strands or bundles of fibers 13a twisted or spun loosely to form a yarn or roving.

The tape thus formed and in its semi-cured state may be employed in the manufacture of such high temperature components as the rocket engine casing illustrated in FIGURE 3. In this case, the tape 25 formed as above described in connection with the illustrations of FIGURES 1 and 2 is wound in successive windings upon a suitable forming mandrel 26 in any predetermined number of layers such as 27 and 28. Reference to FIGURES 3 and 4 will disclose that the consecutive windings of the tape in any particular layer of the laminated rocket engine construction are parallel, either being in side-by-side abutment or nominally overlapping so that all of the filaments such as the large filaments 29 and the small filaments 30 in layer 27 and the large filaments 31 and small filaments 32 in layer 28 therein are themselves in parallel relationship. At the same time, the direction of the tape winding in the layer 27 is at an angle to that in the layer 28 so that the filaments themselves of either layer are angularly disposed to the reinforcing filaments in the layers immediately above and below them.

It has been found that the presence of the small diameter filaments in the troughs between the large ones greatly improves the interlaminar strength of composite materials formed as illustrated in FIGURES 3 and 4; and it is theorized that this is because the small strands enlarge the reinforced shear plane which, but not for their presence, would be represented solely by the points of intersection between the parallel layer filaments 29 in one layer such as 27 with the angularly disposed crisscrossing filaments such as 31 of the adjoining layer 28. It has also been observed that the wetting of the filaments by the plastic matrix and the completeness and uniformity of their envelopment by the matrix is greatly enhanced by the disclosed use of the relatively small diameter fibers, probably because their presence reduces the cross sections of the spaces or voids to be occupied by the plastic and induces a capillary action whereby the matrix spreads uniformly throughout and around all of the filaments. Perhaps because of the increase in the effective area of reinforced shear plane, perhaps because of the improved intimacy of the relationship between the plastic matrix and the reinforcing filaments or perhaps because of a combination of these things, it has been observed that in structures composed of this material, there is a definite reduction in the tendency of cracks initially formed therein to spread in any direction and this is believed to contribute to the improved interlaminar shear strength of composites according to this invention. At the same time, the material demonstrates a higher apparent modulus of elasticity as a result of which greater strength may be achieved with less material and less weight.

I claim:

1. A fiber reinforced composite plastic laminate having high interlaminary shear strength comprising a plurality of superimposed layers, each of which comprises a plurality of parallel large filaments in a plastic matrix arranged in side-by-side relationship defining troughs above and below the centers of the layers, said large filaments consisting of a central filamentary metallic substrate coated with a material selected from the group consisting of graphite, boride, carbide and nitride, each of said large filaments having a total diameter of at least 3 to 5 mils, and said large filaments in each layer being angularly disposed to the filaments in the adjacent layers; and a plurality of small filaments having a diameter lying in the range $\frac{1}{10}$ to $\frac{1}{25}$ of the large filament diameter, said small filaments substantially filling each of said troughs in said layers.

References Cited
UNITED STATES PATENTS

| | | | |
|---|---|---|---|
| 2,758,951 | 8/1956 | Case | 161—60 |
| 3,189,510 | 6/1965 | Eldred | 161—143 |

ROBERT F. BURNETT, Primary Examiner

WILLIAM A. POWELL, Assistant Examiner

U.S. Cl. X.R.

60—35.6; 117—26; 156—181, 189; 161—59, 60, 143, 175